United States Patent
Kubina et al.

(10) Patent No.: US 11,740,363 B2
(45) Date of Patent: Aug. 29, 2023

(54) METHOD FOR ERROR EVALUATION IN POSITION DETERMINATION

(71) Applicant: Continental Teves AG & Co. OHG, Frankfurt am Main (DE)

(72) Inventors: Bernd Kubina, Eschborn (DE); Roland Burghardt, Frankfurt am Main (DE); Robert Bodenheimer, Idstein (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 55 days.

(21) Appl. No.: 17/620,214

(22) PCT Filed: Jun. 16, 2020

(86) PCT No.: PCT/DE2020/200047
§ 371 (c)(1),
(2) Date: Dec. 17, 2021

(87) PCT Pub. No.: WO2020/253921
PCT Pub. Date: Dec. 24, 2020

(65) Prior Publication Data
US 2022/0252735 A1 Aug. 11, 2022

(30) Foreign Application Priority Data
Jun. 18, 2019 (DE) ...................... 10 2019 208 872.4

(51) Int. Cl.
*G01S 19/23* (2010.01)
*G01S 19/20* (2010.01)
(Continued)

(52) U.S. Cl.
CPC ............. *G01S 19/23* (2013.01); *G01S 19/20* (2013.01); *G01S 19/22* (2013.01); *G01S 19/49* (2013.01)

(58) Field of Classification Search
CPC .......... G01S 19/23; G01S 19/20; G01S 19/22; G01S 19/49
(Continued)

(56) References Cited

U.S. PATENT DOCUMENTS

| 9,273,968 B2 | 3/2016 | Oohashi et al. |
| 2009/0043495 A1 | 2/2009 | Hattori et al. |
| 2014/0253375 A1 | 9/2014 | Rudow et al. |

FOREIGN PATENT DOCUMENTS

| CA | 2848217 A1 * | 3/2013 | ........... G01C 21/165 |
| EP | 2995971 A1 * | 3/2016 | ............. G01S 13/52 |
| WO | 2016153435 A1 | 9/2016 | |

OTHER PUBLICATIONS

"IEEE Guide for Wireless Access in Vehicular Environments (WAVE) Architecture", IEEE STD 1609.0-2013. IEEE Vehicular Technology Society, Mar. 5, 2014, IEEE, New York, NY.
(Continued)

*Primary Examiner* — Harry K Liu

(57) ABSTRACT

The invention relates to a method for error evaluation in position determination, comprising time-synchronous recording of first and second position values, wherein the second position values are recorded by a different measuring method than the first position values; forming a first and a second trajectory (A, B) from the first and the second position values respectively; forming differential vectors (D) between first and second position values recorded at the same time; parallel-shifting the second trajectory (B) along a displacement vector (s) such that the amounts of the differential vectors (D) are minimized on average; evaluating the faultiness of the position determination on the basis of one or more amounts of the differential vectors (D) created as a consequence of the parallel shift.

15 Claims, 1 Drawing Sheet

(51) Int. Cl.
*G01S 19/22* (2010.01)
*G01S 19/49* (2010.01)

(58) Field of Classification Search
USPC .................................................... 342/357.62
See application file for complete search history.

(56) References Cited

OTHER PUBLICATIONS

"IEEE Standard for Information technology—Telecommunications and information exchange between systems Local and metropolitan area networks—Specific requirements—Part 11: Wireless LAN Medium Access Control (MAC) and Physical Layer (PHY) Specifications, Amendment 6: Wireless Access in Vehicular Environments, S 1-51", IEEE Std 802.11p.0-2010, IEEE Computer Society, Jul. 15, 2010, IEEE, New York, NY.
Search Report dated May 8, 2020 from corresponding German patent application No. DE 10 2019 208 872.4.
International Search Report and Written Opinion dated Sep. 25, 2020 from corresponding International patent application No. PCT/DE2020/200047.

* cited by examiner

METHOD FOR ERROR EVALUATION IN POSITION DETERMINATION

BACKGROUND

The invention relates to a method for error evaluation in position determination as well as a control device and a computer program product for performing the method.

Nowadays, the absolute geoposition of a vehicle can be determined with the aid of receivers for global satellite navigation systems (GNSS), hereinafter also referred to as GNSS measurement. The relative motion of a vehicle can additionally be determined, for example with the aid of inertial (IMU) and odometry (ODO) sensor technology installed in the vehicle.

Firstly, the GNSS system makes it possible to measure the receiver position via runtime measurements, also known as code ranging. Secondly, it makes it possible to measure the receiver speed via Doppler shifts.

Within the framework of sensor fusion, GNSS, IMU and ODO measurements can be fused in order to obtain more precise and more readily available position determinations. The sensor fusion is usually realized with Kalman or particle filters.

The known methods for detecting errors in GNSS measurements include receiver autonomous integrity monitoring (RAIM) and fault detection and exclusion (FDE). Furthermore, the code-minus-carrier method and the double delta correlator exist to detect GNSS multipath propagation.

Basically, sporadic errors which are not recognized with the current prior art occur during GNSS measurements in the vehicle. This limits the level of reliability and, therefore, the integrity of the positioning established by means of GNSS.

In position determination, which is to be understood below both in the sense of localization and in the sense of speed or acceleration determination, slowly and rapidly changing errors are found. The causes of rapidly changing measurement errors most notably include so-called non-line-of-sight (NLOS) propagation paths of the radio signal, in particular in the case of moving receivers, but furthermore also errors in the GNSS satellite such as random hardware and software errors, for example exceptionally rapid clock drifts.

The NLOS signals indicated are created by reflection and scattering of the radio signal in the immediate vicinity of the receiver such as, for example, buildings. A distinction can be made here between various possibilities of superimposing undesired NLOS and the desired direct line-of-sight (LOS) signal. A large part of these superimposition possibilities is described by the term multipath propagation.

In the case of fused filter methods, errors in the sensors involved in each case can lead to faulty position determination. Here, in addition to the NLOS signals of the GNSS, drift and offset in the inertial sensor technology, and offsets in the odometry, are to be indicated as possible causes of errors. In particular, Kalman filter solutions show the undesired temporal error propagation.

The GNSS error detectors RAIM and FDE indicated above are basically restricted to an isolated consideration of the GNSS signals, which limits the detection of similar errors (common mode failure). Furthermore, RAIM and FDE show detection weaknesses if multiple satellites are disturbed at the same time.

The object which therefore forms the basis of the invention is to achieve an improved error evaluation in position determination. It should preferably also be achieved that rapidly changing errors in the GNSS measurement, in particular caused by multipath propagation, and/or by errors in measurements of the inertial sensor technology or the odometry, are detected and the integrity of the established vehicle position is therefore increased.

BRIEF SUMMARY

The object is achieved by the features of the independent claims. Preferred further developments are the subject-matter of the dependent claims. By express reference, the claims are made part of the description at this point.

According to an aspect of the invention, a method for error evaluation in position determination comprises the following steps:

recording of first and second position values, wherein the second position values are recorded by a different measuring method than the first position values; temporal synchronizing of the first and second position values, in other words filtering of the first and second position values so that the same time, to which the respective position value refers, can be assigned to one each of a first and a second position value; forming one each of a first and a second trajectory from the synchronized first and second position values; forming differential vectors between the respectively synchronized first and second position values; parallel-shifting the second trajectory along a displacement vector such that the amounts of the differential vectors are minimized on average and evaluating the faultiness and/or integrity of the position determination on the basis of one or more amounts of the differential vectors created as a consequence of the parallel shift. The minimizing of the amounts of the differential vectors on average is preferably not restricted to the arithmetical average, but can for example refer to a weighted or a different type of averaging.

The method indicated is based on the consideration that GNSS multipath propagation has a different influence on various measuring methods, for example runtime measurement and Doppler measurement and, therefore, causes different errors. Consequently, information about the presence of rapidly changing errors can be obtained from the disparity in errors, from which information an integrity measure can in turn be derived.

In order to record the first and second position values, at least two position values are preferably respectively to be determined as samples at determined temporally specified scanning points, wherein the scanning times of the first and second position values can be different. Thus, for example, a scanning rate of a wheel speed sensor, from which first position values are derived, is normally higher than the scanning rate of a GNSS measurement, from which second position values are derived.

The measuring methods for recording the first and second position values preferably differ in that they have a different influenceability of the measurement by errors, in particular by errors in GNSS satellites and/or by GNSS multipath propagation and/or by a lack of available satellites and/or by drifts and/or offsets in inertial and/or odometry sensor technology and/or by errors of environment sensor technology.

A runtime measurement, often also referred to as code ranging or pseudorange, is preferably understood to mean that the time difference which passes between the outputting of a GNSS signal from the phase center of the satellite antenna up to reception of the signal in the phase center of the receiver antenna is measured. Multiplying this by the speed of light produces the spacing between the two, which is, admittedly, very inaccurate due to the faulty synchronization of the clocks of the satellite and receiver.

In addition to the carrier signal and the ephemeris data of the satellite, the GNSS signal comprises a code which is also contained in the receiver and which the receiver shifts, so to speak, so far that it is synchronized with the code received from the satellite. This shift corresponds to the measured runtime.

In carrier phase measurement, the phase position of the carrier signal is captured, which allows a particularly precise measurement. However, the exact number of phase transitions is initially unknown.

The relative motion between a GNSS satellite and the receiver causes a Doppler shift. During Doppler measurement, this is measured in order to be able to determine the speed of the receiver therefrom. This speed determination can also be used for position determination in a known manner.

Inertial sensor technology (IMU) normally comprises sensors which measure accelerations and rotation rates, while odometry allows the vehicle's own position to be determined by measuring data from a propulsion system such as, for example, wheel speeds and/or steering motions.

The indicated methods react to GNSS multipath propagation differently. Inertial sensor technology and odometry or the errors thereof are even in principle independent of the effects of GNSS multipath propagation, since they do not have recourse to satellite signals.

Therefore, the respective measuring method preferably corresponds to a runtime measurement by means of GNSS, carrier phase measurement by means of GNSS, Doppler measurement by means of GNSS, acceleration, rotation rate and/or steering angle measurement, motion estimation by means of camera, radar and/or lidar or a combination thereof. Consequently, the relative comparison of the trajectories based on the different measuring methods leads to a good error or integrity evaluation without great outlay.

According to a preferred embodiment of the method, the faultiness of the position determination is evaluated on the basis of the amount of the differential vector which extends between the first and second position values recorded at the last time. That is to say that, in other words, the difference in the current position value is checked. For example, the check can include a comparison being made with one threshold value or multiple threshold values, or a quality measure for the errors or integrity of the position determination corresponding to the difference being determined from a look-up table.

The faultiness of the position determination can alternatively or additionally be evaluated on the basis of the amount of the differential vector which has the greatest amount value among all or a specified number of most recently formed differential vectors or among multiple weighted differential vectors. For example, of the amounts of the differential vectors, instead of all the available values, only the last five amounts or a situation-dependent variable number of the most recently established differential vectors and their amounts can be constantly enlisted to determine the maximum value from this group, which is used for the evaluation.

Alternatively or additionally, the faultiness of the position determination can be evaluated on the basis of the sum or quadratic sum of the amounts of multiple weighted differential vectors or of a specified number of most recently formed differential vectors. Here as well, a variable number would be possible instead of a specified number. Basically, the differential vectors or the amounts thereof can be used with the individual possibilities indicated and in any combination thereof for the evaluation.

In accordance with a preferred embodiment, the evaluation of the faultiness is made available as an input variable to a fusion filter, in particular a Kalman filter or particle filter, for continual determination of a position from multiple measuring variables.

According to a further aspect of the invention, a control device is configured to perform a method as described above.

The control device preferably has a memory and a processor, wherein the method is saved in the memory in the form of a computer program and the processor is configured to carry out the method when the computer program is loaded from the memory into the processor.

The computer program of the control device preferably comprises program code means in order to perform all the steps of the method when the computer program is run on a computer or one of the previously indicated devices.

According to a further aspect of the invention, a computer program product comprises a program code which is stored on a computer-readable data carrier and which, when it is run on a data processing apparatus, performs one of the methods indicated above.

The properties, features and advantages of this invention, which have been described above, as well as the way in which these are achieved will become clearer and much more comprehensible in connection with the following description of an exemplary embodiment in connection with the drawings.

DETAILED DESCRIPTION

Figure 1:
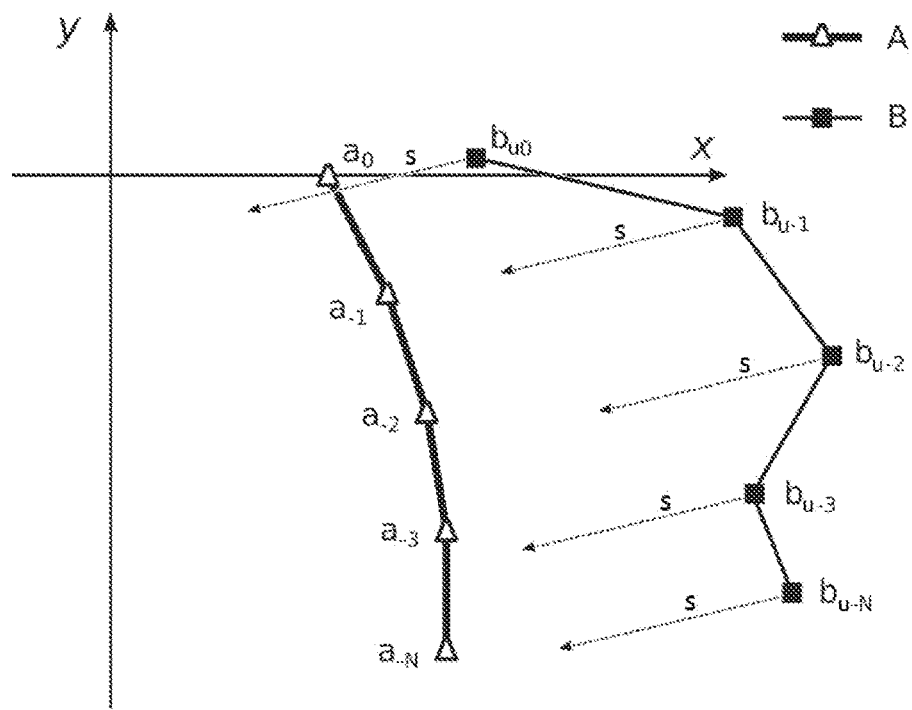
FIG. 1 schematically represents a parallel shifting of a second trajectory along a displacement vector.
Figure 2:
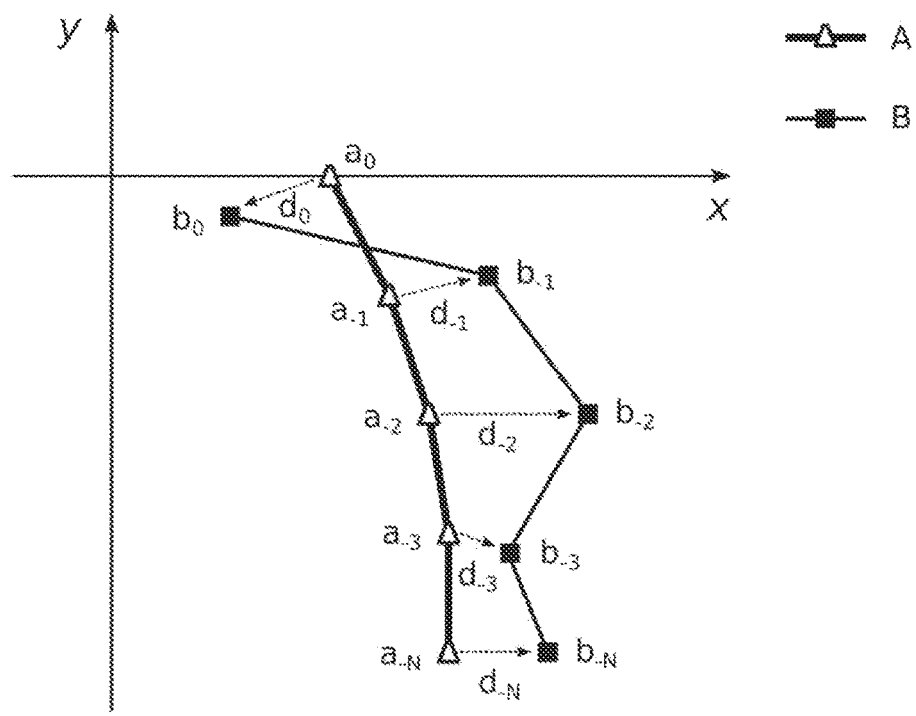
FIG. 2 schematically depicts differential vectors formed between first position values and the parallel-shifted second position values assigned to the same times.

FIGS. 1 and 2 show schematically, and for the sake of clarity, a 2-dimensional representation of a relative comparison of two trajectories.

With the aid of the history of GNSS runtime measurements, an absolute motion trajectory of the vehicle or receiver can be represented in geographic coordinates. The absolute trajectory determined by means of runtime measurement can be transformed into any relative coordinate system. A relative motion trajectory of the vehicle can be calculated both from the history of GNSS Doppler measurements and from the history of measurements of the inertial sensor technology (IMU) and measurements of the odometry (ODO).

In a first step, first and second position values are recorded or scanned, possibly with a different scanning rate. The first position value assigned to a determined time and the second position value assigned to this time are subsequently recorded. This is repeated for a suitable number of times, preferably with the same temporal interval, so that a trajectory can be formed from the thus synchronized first position values and second position values respectively which, depending on the temporal intervals of the samples and under the influence of certain deviations, reproduces the temporal position progression, that is to say the motion, in each case with a certain accuracy.

The first position values and, therefore, the first trajectory A are recorded, for example, by means of runtime measurement. The second position values and, therefore, the second trajectory B are recorded, for example by means of Doppler measurement. Consequently, one and the same multipath propagation has a different effect on the first and the second trajectory. It would additionally be possible to record a further trajectory by a further measuring method and to also apply the method to this, for example to better determine errors in the inertial sensor technology or odometry.

However, FIGS. 1 and 2 are restricted to the first trajectory A, spanned by the first position values $a_0, a_{-1}, \ldots, a_{-N}$ and the second trajectory B, spanned by the second position values $b_0, b_{-1}, \ldots, b_{-N}$. In this case, the points $a_i=(a_{x,i}, a_{y,i}, a_{z,i},)$, and $b_i=(b_{x,i}, b_{y,i}, b_{z,i},)$ respectively describe the relative receiver position at time i.

As represented schematically in FIG. 1, a parallel-shifting of the second trajectory B along a displacement vector s is effected in the next step. This can be formulated mathematically for an exemplary second position value as $b_i=b_{u,i}+s=(b_{x,u,i}, b_{y,u,i}, b_{z,u,i})+(s_x, s_y, s_z)$, wherein $b_{u,i}$ denotes one of the second position values prior to the application of the parallel shift. The amount and direction of the displacement vector s is determined from the condition that the amounts of a quantity D of differential vectors, which are described below, are minimized on average, that is to say in other words the average formed from these amounts is as small as possible. Various possible ways of forming an average are known to the person skilled in the art.

As represented in FIG. 2, a quantity D of differential vectors $d_0, d_{-1}, \ldots, d_{-N}$, is formed between the first position values and the parallel-shifted second position values assigned to the same times in a further step. For example, the differential vector $d_0$ runs, starting from point $a_0$, up to point $b_0$ and the differential vector $d_{-1}$ runs, starting from point $a_{-1}$, up to point $b_{-1}$.

The quantity D of differential vectors thus obtained is a quality measure for the errors and integrity of the determined motion trajectories A, B. A small or vanishingly low differential vector suggests minor errors or a high integrity. In particular, the difference $|d_0|$ of the current, that is to say, last recorded position value, a maximum difference $d_{max}=\max(|D|)=\max(|d_0|, |d_{-1}|, \ldots, |d_{-N}|)$ and/or the simple or square sum of the individual differences di of the trajectories A, B can be formed as error indicators.

The method according to the invention can be deployed, for example, in a vehicle which is explained in more detail below, but is not represented in the figures. The vehicle comprises, for example, an on-board system with a data bus which can be, for example, a Controller Area Network bus known to the person skilled in the art, called a CAN bus, or a FlexRay bus known to the person skilled in the art. These data buses are standardized and their method of operation can be looked up in the relevant specifications.

Various modules are connected to the data bus, all of which communicate with one another via the data bus. These modules include a control unit for an electronic stability control of the vehicle which is not represented in greater detail, hereinafter referred to as the ESC control unit, a control unit for an electronic steering angle support of the vehicle which is not represented in greater detail, hereinafter referred to as the EPS control unit, a control unit for an airbag of the vehicle which is not represented in greater detail and further control units in the vehicle which is not represented in greater detail. These further control units include a control unit for an electronic braking assistant, a control unit for an electronic steering assistant and a control unit for automatic speed control.

In addition, a display unit, which is to be referred to below as an HMI unit for "Human Machine Interface" unit, is connected to the data bus. It can also feed data into the data bus in a manner not shown if, for example, the HMI unit is configured as a touchscreen.

Finally, a device for distributing data about the vehicle, not shown, is also connected to the data bus, which device is to be referred to below as an M2XPro-device for "motion information to different providers" device.

The M2XPro device is embedded in an M2XPro cluster which provides an electrical power supply, hardware interfaces and protective means and a housing for the M2XPro device.

The M2XPro device has a vehicle dynamics or inertial sensor technology interface, a wheel speed interface, a steering angle interface, a Global Position System interface, hereinafter referred to as a GNSS interface, and an output interface.

Vehicle dynamics data, which are provided by an optional pitch rate sensor, an optional roll rate sensor and a yaw rate sensor in a manner known to the person skilled in the art, are received with the inertial sensor technology. In detail, the vehicle dynamics data therefore comprise an optional pitch rate, an optional roll rate and a yaw rate. A longitudinal, transverse and vertical acceleration can also be received correspondingly by a longitudinal, transverse and vertical acceleration sensor via the vehicle dynamics interface in a manner not represented.

The wheel speeds of the individual wheels of the vehicle, not represented in greater detail, can be received at the wheel speed interface.

A steering angle of a steering wheel of the vehicle, not represented in greater detail, can be received at the steering angle interface.

Finally, position data can be received at the GNSS interface from a GNSS receiver, which can be arranged outside the M2XPro cluster.

The received data received via the various reception interfaces indicated above are supplied to the output interface which can also perform the transformation of the received data into transmission data, yet to be written, beyond the pure delivery of the data to other modules. To this end, the output interface has a fusion filter which receives the received data and, based on these, produces the above-mentioned data about the vehicle, not shown. The fusion filter can make use of the information about the quality measure or the integrity of the position determination, which is obtained with the method according to the invention.

The data produced by the fusion filter can be any information about the vehicle. Thus, for example, this information can comprise verified data which have been checked for their reliability on the basis of redundant information. This can be, for example, a verified yaw rate which has been checked for plausibility based on the steering angle, since the steering angle and the yaw rate are dependent on one another. Alternatively or additionally, this information can also include, for example, position data which cannot be supplied by the GNSS receiver. If the vehicle, not represented in greater detail, is driving for example in locations where no GNSS signals can be received such as in a tunnel, position data which cannot be supplied by the GNSS receiver can be derived, for example, by the fusion apparatus based on the last position data received from the GNSS receiver, the steering angle and a speed of the vehicle, not shown, derived from the wheel speeds. The fusion filter is therefore designed to generate new sensor data from sensor data present in the vehicle, not represented in greater detail, or to verify sensor data already existing, for example through plausibility checks. The fusion filter determines which input variables are the most reliable for determining the data, among other things, with the aid of the method according to the invention. To this end, the M2XPro device has a corresponding control device.

The data generated by the fusion can be fed back into the data bus, on the one hand, or transferred to a filter. The generated data fed into the data bus are then available to other modules for further processing.

The generated data transferred to the filter can be filtered there in a manner not specified in greater detail and transferred to a distributor antenna with a further filter. The distributor antenna is used for communication of the vehicle, not shown, with other vehicles and is therefore referred to below as the Car2X antenna. The communication can take place wirelessly, wherein a so-called automotive WLAN can be deployed, can be based on IEEE 802.11p and can have further protocol layers correspondingly based thereon such as IST-G5 in Europe or IEEE 1609 in America. The filter can therefore transfer filtered generated data to the Car2X antenna or receive received data from the Car2X antenna.

The filtered generated data or the received data can be deployed as input data for a wide variety of applications. These applications can, for example, comprise the derivation of position data previously mentioned if the GNSS signal can no longer be received. Alternatively or additionally, these applications can comprise information applications which provide information, for example, about traffic jams or other traffic situations or traffic-relevant traffic situations. The applications can be combined under the term Car2X applications which can, in turn, feed their output data, that is to say the forwarded position data or the traffic information, into the data bus.

The interfaces mentioned above can be combined in a hardware interface in the M2XPro device. Further hardware elements can be provided to realize the other functions in the M2XPro device.

The output data such as the forwarded position data or the traffic information can be displayed, for example, on the HMI device for navigation.

The input data or the generated data can be distributed to other modules in the vehicle, not represented, which can, for their part, have Car2X applications. In addition, system algorithms which use the generated data directly can be present in the individual control units.

For example, the wheel speeds and the steering angle can accordingly be captured by the ESC control unit and the EPS control unit, which have to capture said data anyway for their intended operation.

It should be pointed out that features which are merely disclosed in the description or features which are disclosed in the description or in a claim only in conjunction with other features can, in principle, be of independent inventive relevance. They can therefore also be included separately in claims to distinguish from the prior art.

The invention claimed is:

1. A method for error evaluation in position determination, comprising:
  recording of first and second position values, wherein the second position values are recorded by a different measuring method than the first position values;
  temporal synchronizing of the first and second position values and forming a first and a second trajectory (A, B) each from the synchronized first and second position values;
  forming differential vectors (D) between the respectively synchronized first and second position values;
  parallel-shifting the second trajectory (B) along a displacement vector (s) such that the amounts of the differential vectors (D) are minimized on average;
  evaluating the faultiness and/or integrity of the position determination on the basis of one or more amounts of the differential vectors (D) created as a consequence of the parallel shift; and
  wherein the respective measuring method corresponds to one or a combination of the following:
  runtime measurement,
  Doppler measurement,
  carrier phase measurement,
  and/or motion estimation by means of cameras, radar, and/or lidar.

2. The method according to claim 1, wherein the measuring methods for recording the first and second position values differ in that they have a different influenceability of the measurement by errors, in particular by errors in GNSS satellites and/or by GNSS multipath propagation and/or by a lack of available satellites and/or by drifts and/or offsets in inertial and/or odometry sensor technology and/or by errors of environment sensor technology.

3. The method according to claim 2, wherein the respective measuring method corresponds to at least:
  acceleration, rotation rate and/or steering angle measurement.

4. The method according to claim 3, wherein the faultiness of the position determination is evaluated on the basis of the amount of the differential vector which extends between the first and second position values recorded at the last time.

5. The method according to claim 4, wherein the faultiness of the position determination is evaluated on the basis of the amount of the differential vector which has the largest amount value among multiple weighted differential vectors (D).

6. The method according to claim 5, wherein the faultiness of the position determination is evaluated on the basis of the sum or quadratic sum of the amounts of multiple weighted differential vectors (D) or of a specified number of most recently formed differential vectors (D).

7. The method according to claim 6, wherein the evaluation of the faultiness is made available as an input variable to a fusion filter, in particular Kalman filter, for continual determination of a position from multiple measuring variables.

8. A control device for evaluating error in position determination, by performing operations comprising;
  recording of first and second position values, wherein the second position values are recorded by a different measuring method than the first position values;
  temporal synchronizing of the first and second position values and forming a first and a second trajectory (A, B) each from the synchronized first and second position values;
  forming differential vectors (D) between the respectively synchronized first and second position values;
  parallel-shifting the second trajectory (B) along a displacement vector(s) such that the amounts of the differential vectors (D) are minimized on average;

evaluating the faultiness and/or integrity of the position determination on the basis of one or more amounts of the differential vectors (D) created as a consequence of the parallel shift; and wherein the respective measuring method corresponds to one or a combination of the following:
runtime measssurement,
Doppler measurement,
carrier phase measurement,
and/or motion estimation by means of cameras, radar, and/or lidar.

9. The control device according to claim 8, having a non-transitory computer-readable memory and a processor, wherein the computer-readable instructions are saved in the non-transitory memory in the form of a computer program, and the processor is configured to carry out the computer-readable instructions when the computer program is loaded from the memory into the processor.

10. The control device according to claim 9, wherein the measuring operations for recording the first and second position values differ in that they have a different influence-ability of the measurement by errors, in particular by errors in GNSS satellites and/or by GNSS multipath propagation and/or by a lack of available satellites and/or by drifts and/or offsets in inertial and/or odometry sensor technology and/or by errors of environment sensor technology.

11. The control device according to claim 10, wherein the respective measuring method corresponds to at least: acceleration, rotation rate, and/or steering angle measurement.

12. The control device according to claim 11, wherein the faultiness of the position determination is evaluated on the basis of the amount of the differential vector which extends between the first and second position values recorded at the last time.

13. The control device according to claim 12, wherein the faultiness of the position determination is evaluated on the basis of the amount of the differential vector which has the largest amount value among multiple weighted differential vectors (D).

14. The control device according to claim 13, wherein the faultiness of the position determination is evaluated on the basis of the sum or quadratic sum of the amounts of multiple weighted differential vectors (D) or of a specified number of most recently formed differential vectors (D).

15. The control device according to claim 14, wherein the evaluation of the faultiness is made available as an input variable to a fusion filter, in particular Kalman filter, for continual determination of a position from multiple measuring variables.

* * * * *